United States Patent
Heineke et al.

(10) Patent No.: US 6,985,674 B2
(45) Date of Patent: Jan. 10, 2006

(54) FIBER OPTIC TRANSCEIVER ARRAY AND FIBER OPTIC TRANSCEIVER CHANNEL FOR SHORT WAVE FIBER OPTIC COMMUNICATIONS

(75) Inventors: Randolph B. Heineke, Rochester, MN (US); David John Orser, Farmington, MN (US)

(73) Assignee: International Business Machines Corporation, Armonk, NY (US)

(*) Notice: Subject to any disclaimer, the term of this patent is extended or adjusted under 35 U.S.C. 154(b) by 833 days.

(21) Appl. No.: 09/995,108

(22) Filed: Nov. 27, 2001

(65) Prior Publication Data

US 2003/0099017 A1    May 29, 2003

(51) Int. Cl.
*H04B 10/156* (2006.01)

(52) U.S. Cl. ............................ 398/214; 438/11
(58) Field of Classification Search ............... 398/9, 398/22, 24, 135–139; 438/7, 14–18; 365/14, 365/24

See application file for complete search history.

(56) References Cited

U.S. PATENT DOCUMENTS

| | | | | |
|---|---|---|---|---|
| 3,969,670 A | * | 7/1976 | Wu | 324/96 |
| 5,475,224 A | * | 12/1995 | Koh | 250/349 |
| 5,686,833 A | * | 11/1997 | Spinner | 324/158.1 |

OTHER PUBLICATIONS

U.S. Appl. No. 09/995,107, filed Nov. 27, 2001, by Randolph B. Heineke and David W. Siljenberg entitled "Fiber Optic Transceiver Array for Implementing Testing".

U.S. Appl. No. 09/994,229, filed Nov. 27, 2001, by Randolph B. Heineke and David John Orser entitled "Detector for Short Wave Fiber Optic Communications With Compensation to Reduce Detector Jitter".

* cited by examiner

*Primary Examiner*—Leslie Pascal
(74) *Attorney, Agent, or Firm*—Joan Pennington

(57) ABSTRACT

A fiber optic transceiver array and a fiber optic transceiver channel are provided for short wave fiber optic communications. A fiber optic transceiver array for short wave fiber optic communications includes a series of fiber optic transceiver channels. Each fiber optic transceiver channel includes a plurality of test pads. A power distribution bypass capacitor is distributed along the series of fiber optic transceiver channels. A plurality of high voltage power supply and ground connections are coupled through the power distribution bypass capacitor and distributed around the series of fiber optic transceiver channels. A threaded high voltage power supply connection is provided to alternating ones of the series of fiber optic transceiver channels. A threaded ground connection is provided to alternating other ones of the series of fiber optic transceiver channels to reduce power noise generation and susceptibility to noise between adjacent channels. A power to ground decoupling capacitor included with each fiber optic transceiver channel also enhances power noise sensitivity reduction. A fiber optic transceiver channel for short wave fiber optic communications includes at least a high voltage power supply connection and a ground connection. A plurality of test pads includes at least a ground connection and a pair of differential output connections. A channel decoupling capacitor is positioned proximate to the pair of differential output connections.

7 Claims, 3 Drawing Sheets

FIBER OPTIC TRANSCEIVER ARRAY AND FIBER OPTIC TRANSCEIVER CHANNEL FOR SHORT WAVE FIBER OPTIC COMMUNICATIONS

RELATED APPLICATIONS

Related U.S. patent applications assigned to the present assignee are being filed on the same day as the present patent application including:

U.S. patent application Ser. No. 09/995,107, entitled "FIBER OPTIC TRANSCEIVER ARRAY FOR IMPLEMENTING TESTING" by Randolph B. Heineke and David W. Siljenberg; and U.S. patent application Ser. No. 09/994,229, entitled "DETECTOR FOR SHORT WAVE FIBER OPTIC COMMUNICATIONS WITH COMPENSATION TO REDUCE DETECTOR JITTER" by Randolph B. Heineke and David John Orser.

FIELD OF THE INVENTION

The present invention relates generally to the data communications field, and more particularly, relates to a fiber optic transceiver array and a fiber optic transceiver or fiber optic transceiver channel for short wave fiber optic communications.

DESCRIPTION OF THE RELATED ART

Demand for bandwidth in data communications appears to be generally unlimited. One of the economic considerations to meet this demand is to minimize the physical size of fiber optic transceivers. One known arrangement uses an array of integrated photodetector and preamplifiers to reduce the number of components and connections in the fiber optic transceivers and gain benefits of compactness.

Achieving reliable signal integrity from an array is hampered by limiting wiring room to provide separate power, ground, signal and shield lines for each signal. Photodetectors are especially prone to noise coupled into the power supply. To maximize photodetector bias voltage, one end is normally operated near power and the other end is normally operated near the ground.

A need exists for an improved fiber optic transceiver channel and an improved fiber optic transceiver array for short wave fiber optic communications. It is desirable to provide such improved fiber optic transceiver channel and improved fiber optic transceiver array that are compact and minimize the number of components and connections, while providing effective and reliable signal integrity. As used in the following description and claims, the terms fiber optic transceiver and fiber optic transceiver channel should be understood to include a fiber optic receiver receiving a light beam input and a transmitter providing a voltage output.

SUMMARY OF THE INVENTION

A principal object of the present invention is to provide an improved fiber optic transceiver channel and fiber optic transceiver array for short wave fiber optic communications. Other important objects of the present invention are to provide such fiber optic transceiver channel and fiber optic transceiver array for short wave fiber optic communications substantially without negative effect and that overcome many of the disadvantages of prior art arrangements.

In brief, a fiber optic transceiver array and a fiber optic transceiver channel are provided for short wave fiber optic communication. A fiber optic transceiver array for short wave fiber optic communications includes a series of fiber optic transceiver channels. Each fiber optic transceiver channel includes a plurality of test pads. A power distribution bypass capacitor is distributed along the series of fiber optic transceiver channels. A plurality of high voltage power supply and ground connections are coupled through the power distribution bypass capacitor and distributed around the series of fiber optic transceiver channels. A threaded high voltage power supply connection is provided to alternating ones of the series of fiber optic transceiver channels.

In accordance with features of the invention, a threaded ground connection is provided to alternating other ones of the series of fiber optic transceiver channels to reduce power noise generation and susceptibility to noise between adjacent channels. A power to ground decoupling capacitor included with each fiber optic transceiver channel also enhances power noise sensitivity reduction.

A fiber optic transceiver channel for short wave fiber optic communications includes at least a high voltage power supply connection and a ground connection. A plurality of test pads includes at least a ground connection and a pair of differential output connections. A channel decoupling capacitor is positioned proximate to the pair of differential output connections.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
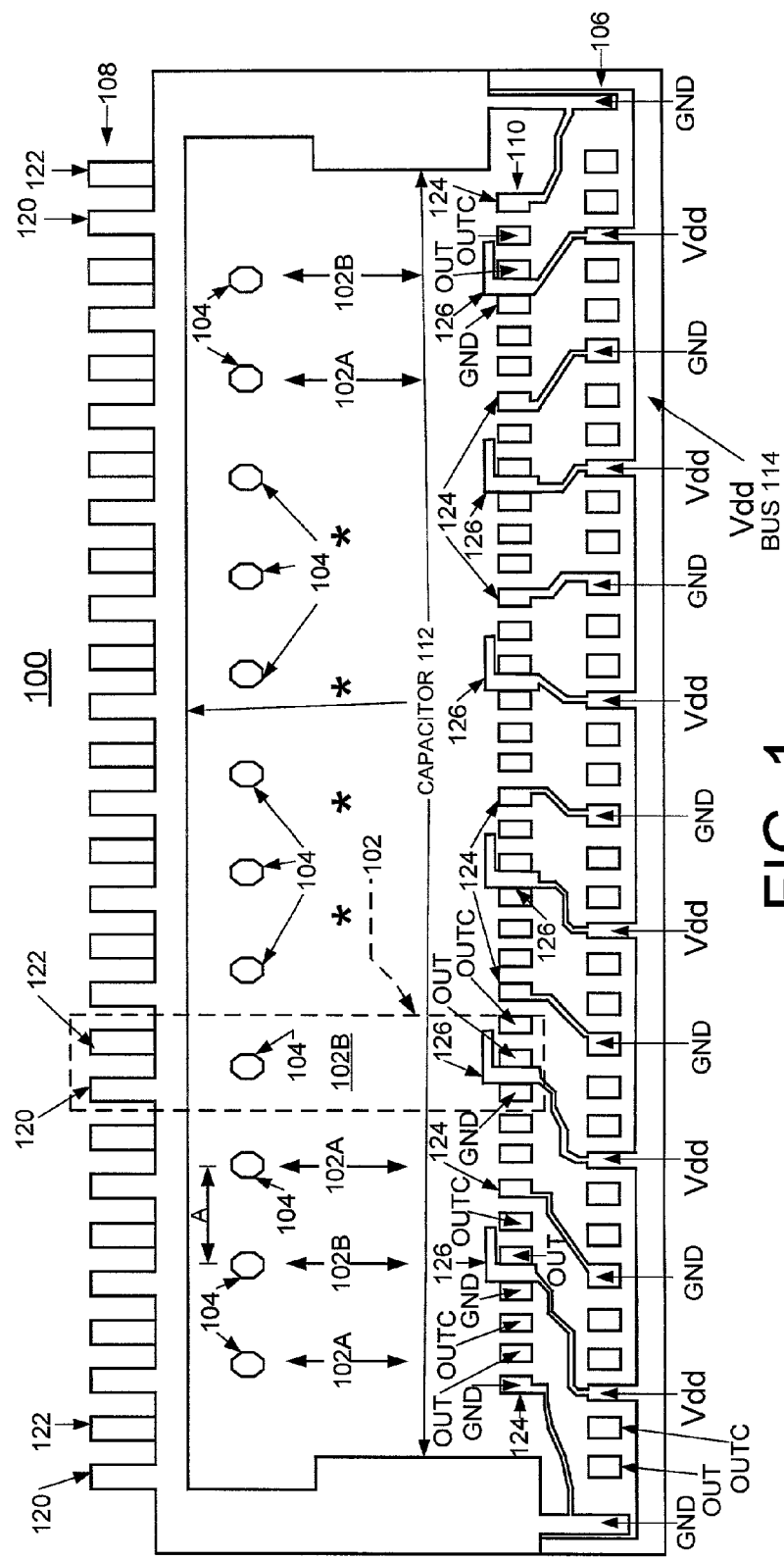
FIG. 1 is a schematic elevational view illustrating an array of fiber optic transceivers in accordance with the preferred embodiment.

Having reference now to the drawings, in FIG. 1, there is shown an array of fiber optic transceivers generally designated by the reference character 100 in accordance with the preferred embodiment. Fiber optic transceiver array 100 includes a plurality of fiber optic transceivers or fiber optic transceiver channels 102, with one channel 102 indicated in dotted line. One photodetector 104 is included in each of multiple fiber optic transceiver channels 102. As shown in FIG. 1, fiber optic transceiver array 100 includes a series of twelve fiber optic transceiver channels 102, each having an associated one of twelve photodetectors 104. The photodetectors 104 are spaced apart as indicated by an arrow labeled A. The photodetectors 104 are spaced apart, for example, at 250 um, preferably substantially equal to a predefined spacing between fibers in a standard parallel fiber optic cable (not shown).

In accordance with features of the preferred embodiment, effective and reliable signal integrity is achieved within the fiber optic transceiver channels 102 of fiber optic transceiver array 100. Power and ground lines are shared and used as shields with low bypass impedance power and ground connections distributed along the fiber optic transceiver array 100. Impedance benefits are achieved by providing a power distribution bypass capacitor among the channels and supplying currents through the power distribution bypass capacitor. Additional impedance reductions are achieved by threading ground connections and power connections between test pads of alternating sequential channels. To further minimize crosstalk, outputs of the fiber optic transceiver channels 102 are differential and each channel includes bypass or decoupling capacitance positioned near the differential outputs.

Fiber optic transceiver array 100 includes a plurality of bottom bond pads 106, a plurality of top power probe pads 108, and a plurality of test probe pads 110 located above the bottom bond pads 106. Power is supplied into the fiber optic transceiver array 100 through bottom bond pads 106 and top power probe pads 108. As shown in FIG. 1, fiber optic transceiver array 100 includes thirty-seven bond pads 106 and twenty-eight power probe pads 108 and thirty-six test probe pads 110.

Fiber optic transceiver array 100 includes a large overchip, power distribution bypass capacitor 112. Fiber optic transceiver array 100 includes a high voltage power supply Vdd bus bar 114 that distributes a high voltage power supply Vdd around the perimeter of the array 100 through the large over-chip, power distribution bypass capacitor 112. Grounds are distributed around the perimeter of the array 100 in a similar manner through bypass capacitor 112.

Power probe pads 108 include alternating ground and high voltage power supply Vdd pads 120 and 122. One ground pad 120 and high voltage power supply Vdd pad 122 is included in each fiber optic transceiver channel 102. As shown in FIG. 1, spare ground and high voltage power supply Vdd pads 120 and 122 are provided at each end of the power probe pads 108. Grounds 120 feed to alternating channels 102 from the plurality of power probe pads 108 through the bypass capacitor 112. Bypass capacitor 112 minimizes the impedance between ground 120 and high voltage power supply Vdd 122.

As shown in FIG. 1, each sequential fiber optic transceiver channel 102 in array 100 includes three test probe pads 110 providing connections to ground and differential channel outputs respectively labeled GND, OUT, and OUTC. Bottom bond pads 106 include alternate connections to ground labeled GND and high voltage power supply labeled Vdd spaced apart by respective connections to differential outputs labeled OUT, and OUTC. The thirty-seven bottom bond pads 106 include six pads for high voltage power supply Vdd, seven pads for ground GND and twenty-four pads for differential outputs OUT and OUTC.

As shown in FIG. 1, alternate channels are threaded with power to create two classes of channels indicated by 102A, 102B. A threaded ground connection 124 and a threaded high voltage power supply Vdd connection 126 respectively are provided for alternate fiber optic transceiver channels 102A, 102B. Threaded ground test probe pads 110 of fiber optic transceiver channels 102A are connected to the bottom ground pads 106. Each fiber optic transceiver channel 102B includes the threaded high voltage power supply Vdd connection 126 threaded between the GND and differential output OUT pads 106.

Fiber optic transceiver channel 102A has a low impendence ground 124 reducing its sensitivity to power noise generated by a neighboring fiber optic transceiver channel 102B on power. Fiber optic transceiver channel 102B has a low impendence high voltage power supply Vdd 126 reducing its sensitivity to ground noise generated by a neighboring fiber optic transceiver channel 102B on ground. The fiber optic transceiver channel 102A including the low impendence ground connection 124 is also less likely to generate noise on the power. Similarly the fiber optic transceiver channel 102B including the low impendence power Vdd connection 126 is also less likely to generate noise on the ground.

Figure 2:
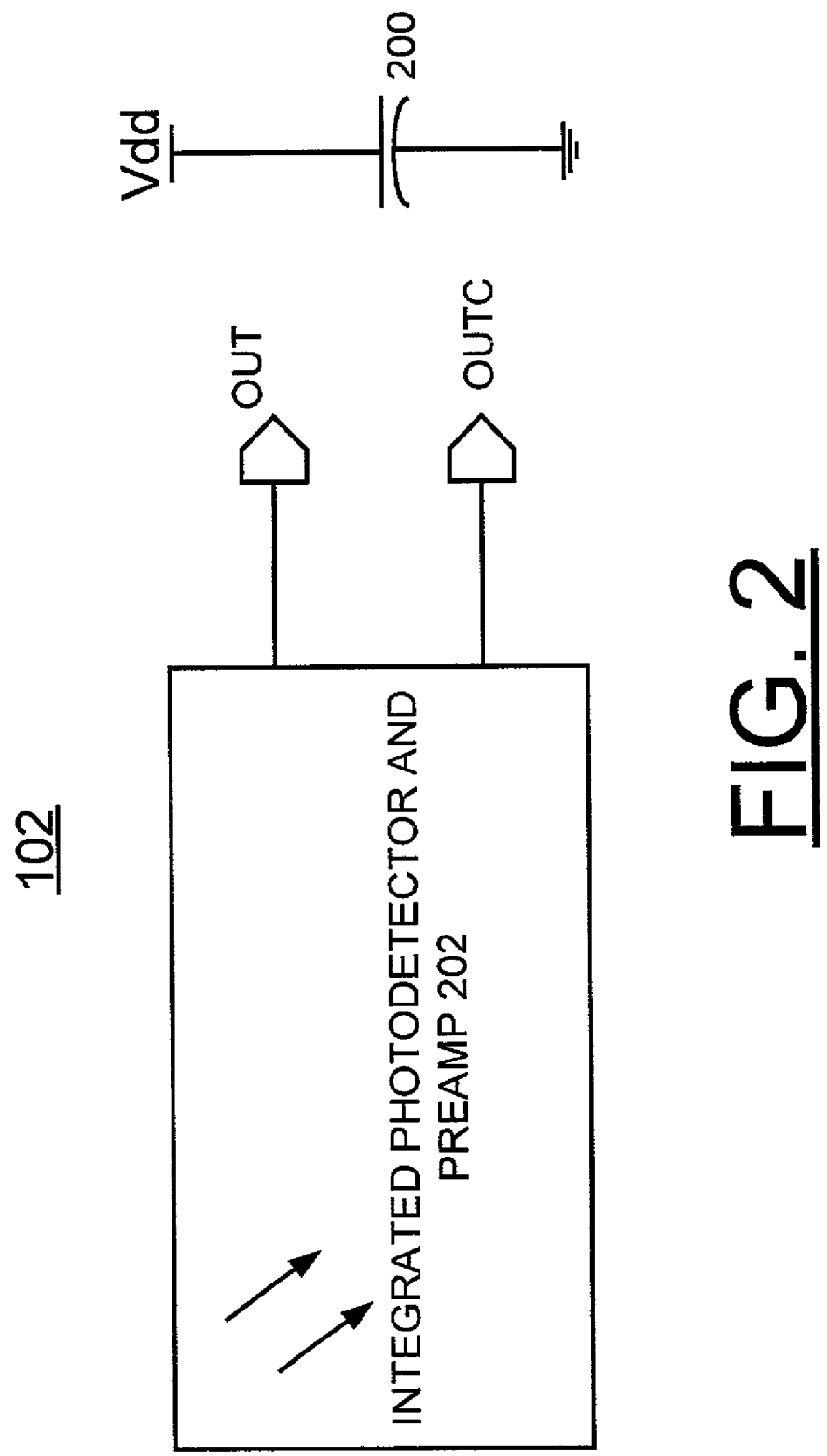
FIG. 2 is a schematic and block diagram illustrating a fiber optic transceiver channel of the fiber optic transceiver array of FIG. 1 in accordance with the preferred embodiment.

Referring now to FIG. 2, the fiber optic transceiver channel 102 of the fiber optic transceiver array 100 of the preferred embodiment is illustrated. Power noise sensitivity reduction also is enhanced by adding power to ground decoupling on each fiber optic transceiver channel 102. Each fiber optic transceiver channel 102 includes a power to ground decoupling capacitor 200 strategically placed near differential outputs OUT and OUTC of an integrated photodetector and preamplifier circuitry 202 of the fiber optic transceiver channel 102.

Figure 3:
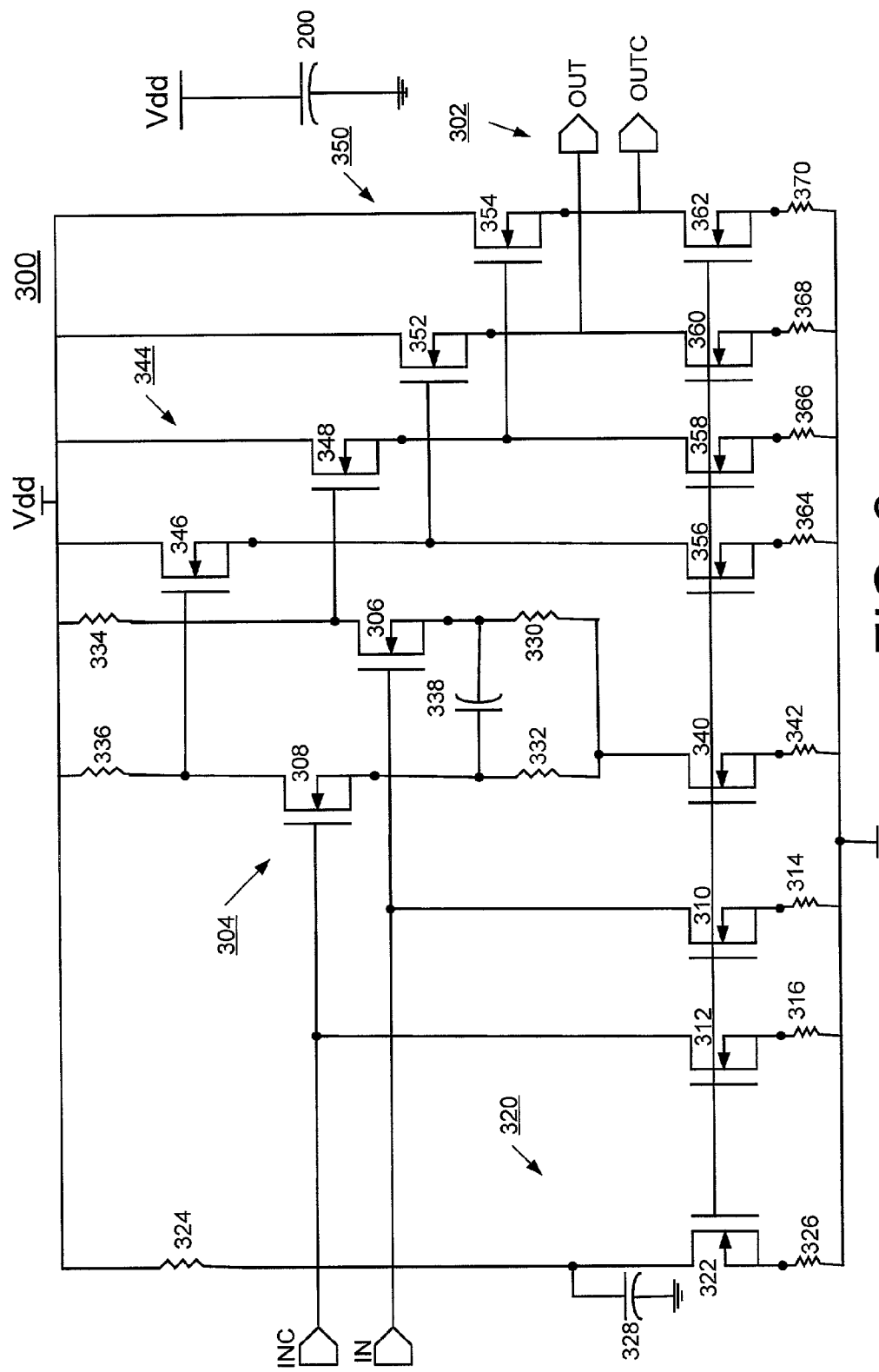
FIG. 3 is a schematic diagram illustrating output buffer circuitry of the fiber optic transceiver channel of FIG. 2 in accordance with the preferred embodiment.

Referring also to FIG. 3, an output buffer circuitry generally designated by the reference character 300 of the integrated photodetector and preamplifier circuitry 202 of the fiber optic transceiver channel 102 is shown. The channel decoupling capacitor 200 is strategically positioned near or proximate to the channel differential outputs 302, OUT and OUTC of the output buffer circuitry 300. The output buffer circuitry 300 is operated differentially to further reduce generation of and susceptibility to noise.

An input stage of the output buffer circuitry 300 includes a differential transistor pair 304 of high gain metal semiconductor field effect transistors (MESFETs) 306 and 308. Output buffer circuitry 300 includes voltage inputs IN and INC respectively applied to a gate input of the differential pair MESFETs 306 and 308. A pair of current source MESFETs 310 and 312 are connected between voltage inputs IN and INC and ground via source resistor 314 and 316. A current source reference 320 provides a reference input to the current source MESFETs 310 and 312. A MESFET 322, a drain resistor 324, a source resistor 326 and a capacitor 328 form the current source reference 320. MESFET 322 is connected between the high voltage Vdd and ground via drain and source resistors 324 and 326. The capacitor 328 is connected between the drain of MESFET 322 and ground. A gate of current source MESFETs 310 and 312 is connected to the gate of current source reference MESFET 322.

Output buffer circuitry 300 includes a pair of source degeneration resistors 330 and 332 to control the gain differential pair 304 of MESFETs 306 and 308. A pair of load resistors 334 and 336 is connected between the drain of MESFETs 306 and 308 and a high voltage power supply Vdd. Connected between the junction connections of MESFETs source and source degeneration resistors 330 and 332 is a capacitor 338. The capacitor 338 passes high slew rate signals more readily than low slew rate signals. The effect of the capacitor 338 is to bypass the gain limiting effects of the source degeneration resistors 330 and 332. Thus differential pair 304 accentuates high slew rates over lower ones. The value of capacitor 338 is chosen to minimize jitter. A current source MESFET 340 having a source resistor 342 is connected to the source degeneration resistors 330 and 332. A gate of current source MESFET 340 is connected to the gate of current source reference MESFET 322.

Output buffer circuitry 300 includes a first source follower pair 344 of MESFETs 346 and 348 having a respective gate connected to the drain of differential pair MESFETs 306 and 308 and a second source follower pair 350 of MESFETs 352 and 354 having a respective gate connected to the source of first source follower pair 344 of MESFETs 346 and 348. The first and second source follower pairs 344 and 350 provide a unity gain stage. A plurality of current source MESFETS 356, 358, 360 and 362 each having a respective source resistor 364, 366, 368 and 370 are connected to the first and second source follower pair MESFETs 346, 348, 352 and 354. The source of MESFETs 352 and 354 of the second source follower pair 350 provide the differential outputs OUT and OUTC of the output buffer circuitry 300 of each fiber optic transceiver channel 102A, 102B.

It should be understood that the present invention is not limited to the use of metal semiconductor field effect transistors (MESFETs) as shown in FIG. 3. It should be understood that the output buffer circuitry 300 of the preferred embodiment could be implemented, for example, with bipolar transistors, N-channel field effect transistors or P-channel field effect transistors.

While the present invention has been described with reference to the details of the embodiments of the invention shown in the drawing, these details are not intended to limit the scope of the invention as claimed in the appended claims.

What is claimed is:

1. A fiber optic transceiver array for short wave fiber optic communications comprising:
   a series of fiber optic transceiver channels; each fiber optic transceiver channel including a plurality of test pads;
   a power distribution bypass capacitor distributed along said series of fiber optic transceiver channels;
   a plurality of high voltage power supply and ground connections coupled through said power distribution bypass capacitor and distributed around said series of fiber optic transceiver channels;
   a threaded high voltage power supply connection extending to alternating ones of said series of fiber optic transceiver channels.

2. A fiber optic transceiver array for short wave fiber optic communications as recited in claim 1 includes a threaded ground connection extending to alternating other ones of said series of fiber optic transceiver channels, said alternating other ones of said series of fiber optic transceiver channels not including said threaded high voltage power supply connection.

3. A fiber optic transceiver array for short wave fiber optic communications as recited in claim 1 wherein said plurality of test pads of each fiber optic transceiver channel includes a ground connection and a pair of differential output connections.

4. A fiber optic transceiver array for short wave fiber optic communications as recited in claim 3 wherein said threaded high voltage power supply connection extending to alternating ones of said series of fiber optic transceiver channels includes said threaded high voltage power supply connection extending between said ground connection and one of said pair of differential output connections.

5. A fiber optic transceiver array for short wave fiber optic communications as recited in claim 3 includes a threaded ground connection extending to alternating other ones of said series of fiber optic transceiver channels to provide alternating low impedance ground and low impedance high voltage power supply channels in said series of fiber optic transceiver channels.

6. A fiber optic transceiver array for short wave fiber optic communications as recited in claim 1 wherein each said fiber optic transceiver channel includes a channel decoupling capacitor positioned proximate to said pair of differential output connections.

7. A fiber optic transceiver array for short wave fiber optic communications as recited in claim 1 wherein said each said fiber optic transceiver channel includes a photodetector and said series of fiber optic transceiver channels have a predefined spacing between sequential ones of said photodetectors.

* * * * *